(12) United States Patent
Yamaguchi

(10) Patent No.: US 6,947,968 B2
(45) Date of Patent: Sep. 20, 2005

(54) COMMUNICATION APPARATUS AND METHOD

(75) Inventor: Shoichi Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,188

(22) Filed: Dec. 2, 1999

(65) Prior Publication Data

US 2003/0163529 A1 Aug. 28, 2003

(30) Foreign Application Priority Data

Sep. 12, 1998 (JP) .......................................... 10-350548

(51) Int. Cl.⁷ .............................................. G06F 15/16
(52) U.S. Cl. ...................... 709/206; 358/438; 370/352; 380/243; 380/266; 709/232; 709/246
(58) Field of Search ....................................... 709/206

(56) References Cited

U.S. PATENT DOCUMENTS

| | | | | |
|---|---|---|---|---|
| 5,222,136 A | * | 6/1993 | Rasmussen et al. | ........ 380/266 |
| 5,241,596 A | * | 8/1993 | Negi | |
| 5,335,276 A | * | 8/1994 | Thompson et al. | ......... 380/266 |
| 5,430,800 A | * | 7/1995 | Miura | |
| 5,521,719 A | * | 5/1996 | Yamada | |
| 5,608,786 A | * | 3/1997 | Gordon | |
| 5,870,549 A | * | 2/1999 | Bobo, II | |
| 6,185,604 B1 | * | 2/2001 | Sekiguchi | |
| 6,191,007 B1 | | 2/2001 | Matsui et al. | ................ 438/459 |
| 6,323,108 B1 | | 11/2001 | Kub et al. | .................. 438/458 |

* cited by examiner

Primary Examiner—Bharat Barot
Assistant Examiner—Michael Y Won
(74) Attorney, Agent, or Firm—Fitzpatrick, Cella, Harper & Scinto

(57) ABSTRACT

Provided is a communication apparatus capable of affording an equivalent level of security for both facsimile transmission and electronic mail without the user needing to be aware of the difference between facsimile transmission and electronic mail. When document information is designated as being confidential ("YES" at S104 in FIG. 2) and transmission by E-mail is specified (S108, S109) at the time of a transmission, the document is encrypted and transmitted (S109–S111). When transmission by facsimile communication is specified (S108–S112), on the other hand, the document is transmitted utilizing a private security function (S114).

14 Claims, 2 Drawing Sheets

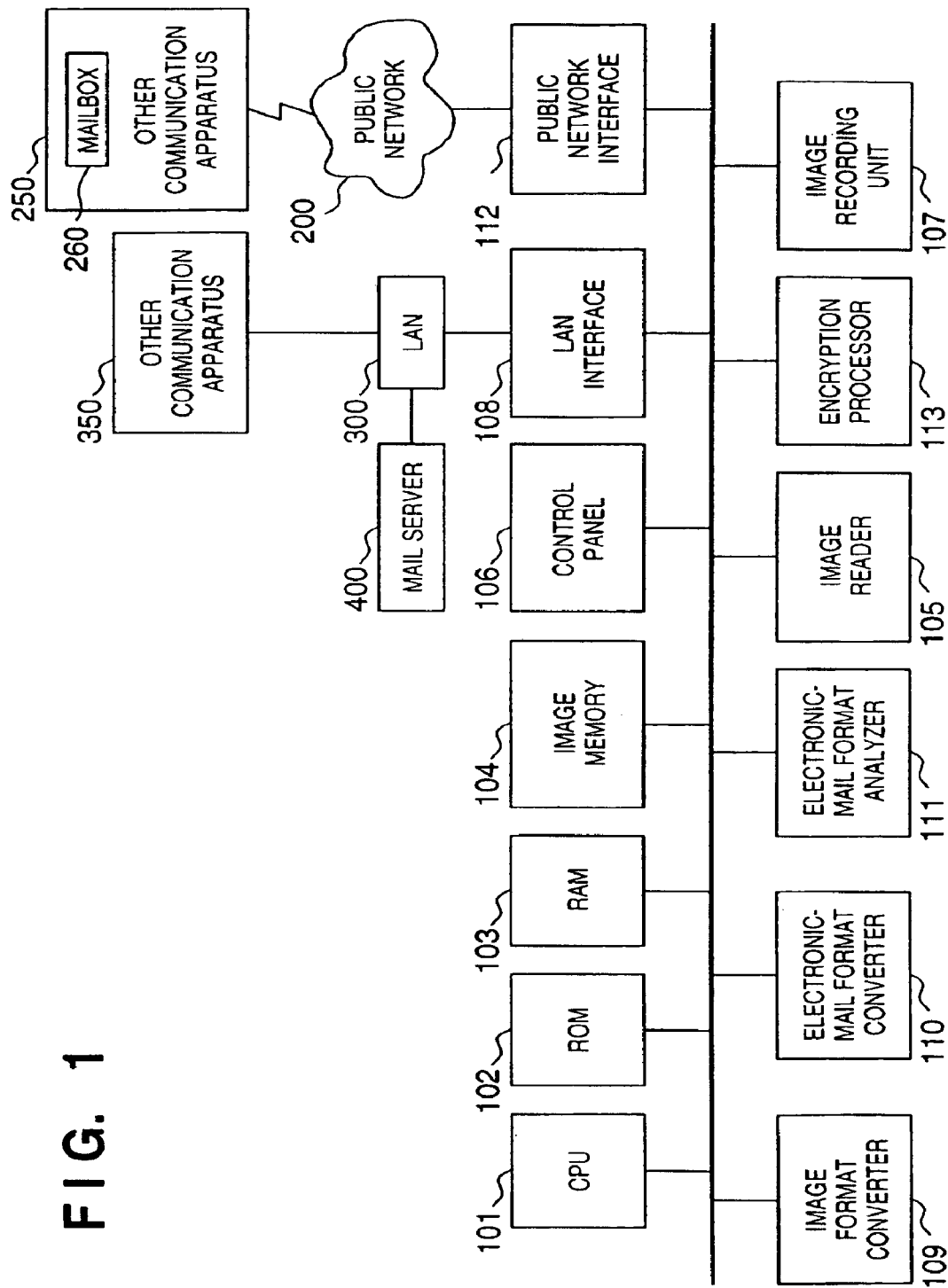

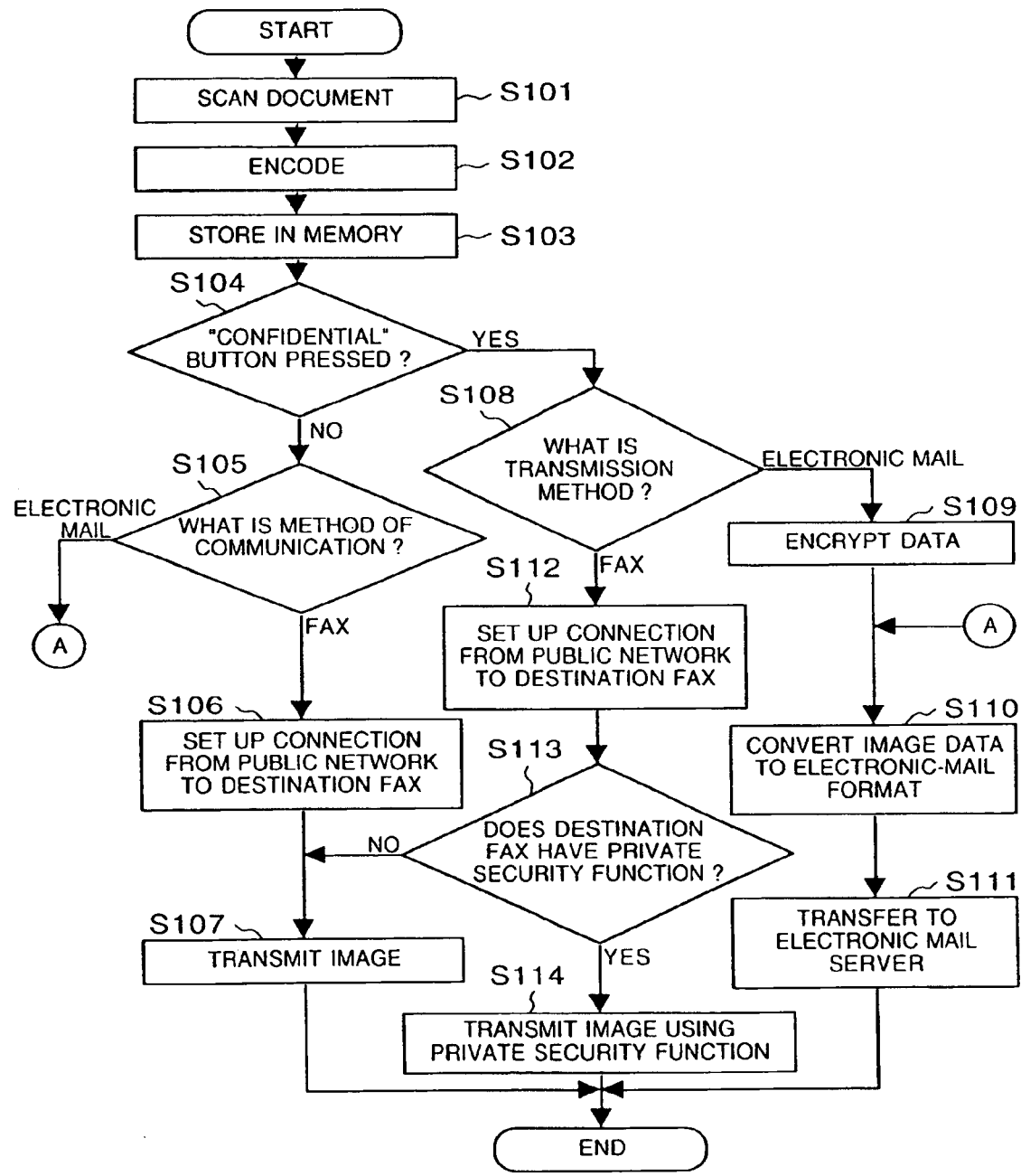

COMMUNICATION APPARATUS AND METHOD

BACKGROUND OF THE INVENTION

This invention relates to a communication apparatus and method capable of transmitting information to another party by facsimile communication or communication using electronic mail.

The increasing use of electronic mail over the Internet in recent years has led to the appearance even of facsimile machines that can be connected to the Internet or to a LAN to make possible the sending and receiving of electronic mail.

Maintaining the security of document information sent and received by facsimile is a concern. Since facsimile communication via an ordinary public telephone network involves a direct one-on-one connection between the communicating parties via the network, the degree of security in terms of the communication path is comparatively high. However, once the faxed documents have been received by the facsimile machine on the receiving side, the received information is, as a rule, printed out by the receiving facsimile machine. The degree of security on the receiving side, therefore, is comparatively low.

A solution has been to use a confidential message-box function to assure secrecy. This function involves the sending side notifying the receiving side of the fact that a confidential transmission is to be made, accumulating the received documents in a confidential message box on the receiving side and outputting the documents on the receiving side only when a correct secret number has been entered.

Conversely, with regard to electronic mail sent over the Internet, mail arrives at the communicating party on the receiving side via a number of unspecified routers and mail servers, etc., that constitute the network, and ASCII character codes are exchanged over this communication path as is. The degree of security in this case, therefore, is comparatively low. However, because an electronic mail scheme comes equipped with a mailbox function, the degree of security of received documents once they have arrived at the receiving party is high.

Thus, the security of documents communicated by facsimile differs greatly from that communicated by electronic mail. In order to assure an equivalent degree of security for both kinds of communication with the conventional apparatus of the type described above, the user must perform different communication operations upon being sufficiently aware of the difference in security of both kinds of communication.

SUMMARY OF THE INVENTION

Accordingly, an object of the present invention is to provide a communication apparatus capable of affording an equivalent level of security for both facsimile transmission and electronic mail without the user needing to be aware of the difference between facsimile transmission and electronic mail.

Another object of the present invention is to afford an equivalent level of security for both facsimile transmission and electronic mail in a case where the user indicates the need for security at the time of document transmission, wherein image data is encrypted if a document is transmitted by an electronic mail function and, if possible, a private security function is used if a document is transmitted by facsimile.

According to the present invention, the foregoing objects are attained by providing a communication apparatus comprising: facsimile communication means for transmitting transmission information to a destination apparatus in accordance with facsimile communication specifications; electronic-mail communication means for transmitting transmission information to a destination apparatus in accordance with electronic-mail specifications; communication designating means for causing transmission of the transmission information by selecting either the facsimile communication means or the electronic-mail communication means; and security designating means for designating whether the transmission information is confidential information; wherein if the transmission information has been designated as being confidential information by the security designating means, the facsimile communication means transmits the transmission information to the destination apparatus as is by facsimile transmission when the facsimile communication means has been designated by the communication designating means, and the electronic-mail communication means encrypts the transmission information and then sends it to the destination apparatus by electronic mail when the electronic-mail communication means has been designated by the communication designating means.

By way of example, if the destination apparatus possesses a private security function, the facsimile communication means transmits the transmission information to a mailbox utilizing this private security function if the transmission information has been designated as being confidential information by the security designating means.

Further, the transmission information is, e.g., document information obtained by reading a document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating an embodiment according to the present invention; and FIG. 2 is a flowchart illustrating transmission processing according to this embodiment.

DESCRIPTION OF THE PREFERRED EMBODIMENT

A preferred embodiment of the present invention will now be described in detail with reference to the drawings.

FIG. 1 is a block diagram illustrating the construction of an image-information communication apparatus according to an embodiment of the present invention.

As shown in FIG. 1, the apparatus includes a CPU 101 for exercising overall control of the apparatus; a ROM 102 for storing the control program; a RAM 103 for storing program control variables and the like; an image memory 104, which is constituted by a DRAM or the like, for storing information such as data that is sent and received.

The apparatus further includes an image reader 105, which includes such components as an image sensor and a document transport mechanism, for optically reading a document and converting it to electrical image data, and a control panel 106 for inputting various operating commands and having an external display unit capable of being implemented by an LCD, LEDs or the like. The external control unit displays the status of the apparatus and the results of commands and thus interfaces the operator.

The apparatus further includes an image recording unit (printer) 107 for printing a received image or file data on printing paper; a LAN interface 108 which exercises control for connecting the apparatus to a LAN 300; and an image format converter 109 for subjecting an image to various format conversions.

The apparatus further includes an electronic-mail format converter 110 for converting text data and image data to an electronic-mail format; an electronic-mail format analyzer 111 for analyzing the content of data having an electronic-mail format; a public-network interface 112 used to connect the apparatus to a facsimile machine 250 of another party via a public network 200; and an encryption processor 113 for encrypting electronic-mail transmission information under the control of the CPU 101.

The public network 200, which is a public facsimile communications network, is capable of being connected to the other communication apparatus 250 via a public-network interface and can transmit information to the other communication apparatus 250 in accordance with facsimile communication specifications. It should be noted that the other communication apparatus 250 capable of being connected to the public network 200 has a mailbox 260.

The LAN 300 is capable of sending and receiving electronic mail. The apparatus according to this embodiment is adapted so that information can be transmitted between this apparatus and another communication apparatus 350 by electronic mail via the LAN interface 108. Numeral 400 denotes a mail server that is capable of accumulating electronic mail.

Reference will be had to FIG. 2 to describe transmission processing for reading a document image by the image reader 105 and transmitting the image to a desired destination in accordance with the embodiment having the construction set forth above. FIG. 2 is a flowchart illustrating transmission processing according to this embodiment.

A sending party who wishes to transmit a document image using the apparatus of this embodiment first places the document in the image reader 105 and uses the control panel 106 to enter various indications necessary for transmission (step S101). These indications include an indication of the destination to which data is to be communicated, an indication as to whether transmission is a confidential transmission, and an indication of the transmission method, i.e., whether transmission is by facsimile or electronic mail.

The sending party commands transmission by entering a command from the control panel 106 to start the scanning of a document. Upon sensing the transmission command, the CPU 101 sends the read document information (transmission information) to the image format converter 109 at step S102. The image format converter 109 encodes this information in accordance with a data format in a case where facsimile communication compliant with the G3 standard, for example, is carried out. The coded transmission information is stored in the image memory 104 at step S103. For example, all documents are stored in the image memory 104.

If the scanning of all documents is finished, then, at step S104, the input state of a key that is for commanding a confidential transmission from the control panel 106 at step 101 is sensed and it is determined whether the command indicates confidential transmission. According to this embodiment, if the command indicates a confidential transmission, it is judged that security needs to be assured at the time of document transmission and data transmission in which security is assured is carried out.

If it is determined at step S104 that the transmission is not confidential, then control proceeds to step S105 and ordinary transmission is performed in accordance with the specified transmission method.

More specifically, if a confidential transmission has not been designated, then, at step S105, it is determined whether the designation of the communication method from the control panel 106 is selection of facsimile transmission or selection of transmission by electronic mail. Control proceeds to step S106 in a case where facsimile communication has been selected to transmit data to the transmission destination.

In this case, a telephone number is specified as the destination identifying information. As a result, the CPU 101 starts up the public-network interface 112 to call the public network 200, sends the public network 200 a telephone number signal such as a dial signal or MF signal corresponding to the specified destination telephone number and calls the apparatus of the other communicating party to thereby form a communication path to the destination apparatus. Next, at step S107, the document image data that has been stored in the image memory 104 is transmitted to the destination apparatus by data communication (facsimile communication). Processing is exited when all image data has been transmitted.

If it is found at step S105 that the designation of the transmission method from the control panel 106 is selection of transmission by electronic mail and an electronic mail address has been specified as the destination of communication, then control proceeds to step S110 to start up the image format converter 109. The latter converts the read document information to an image format such as the TIFF-F format. The converted data is then applied to the electronic-mail format converter 110, which applies coding conforming to electronic mail, such as BASE64, to thereby convert the data to information capable of being transmitted as electronic mail.

Next, at step S111, the LAN interface 108 is activated to transmit the information, along with the mail address of the destination and the mail address of the local apparatus, to the other communication apparatus 350 via the LAN 300. More specifically, the transmission data is transferred from the apparatus of this embodiment to the mail server 400 via the LAN 300, and the other communication apparatus 350 at the destination accepts the data from the mail server 400.

If it is determined at step S104 that the control panel 106 has issued a confidential-transmission command, control proceeds to step S108, where it is determined whether the method of transmission selected at the control panel 106 is transmission based upon electronic mail or facsimile transmission using the public network 200.

If transmission by electronic mail has been selected, control proceeds to step S109, where the encryption processor 113 is activated to encrypt the transmission information that has been stored in the image memory 104. This is followed by the processing from step S110 onward, at which the encrypted information is converted to an image format such as the TIFF-F format by the image format converter 109, then converted to an electronic-mail format by the electronic-mail format converter 110 and transferred to the mail server 400 via the LAN interface 108 and LAN 300.

In the example described above, first encryption processing is executed at step S109 and then a conversion is made to the image format such as TIFF-F. However, the mode of the invention is not limited to the above-described example. By way of example, control may be performed in such a manner that image data is encrypted after a conversion is made to the image format such as TIFF-F. Furthermore, encryption may be performed after a conversion is made to the image format such as TIFF-F. In other words, security can be assured if encryption is performed by the time of transmission to the LAN 300.

If it is found at step S108 that facsimile communication has been selected as the communication method, control proceeds to step S112. Here, through control similar to that of step S106, the public-network interface 112 is started up to call the public network 200, a telephone number signal or the like corresponding to the destination telephone number specified by the control panel 106 is sent to the public network 200 and the desired destination facsimile apparatus, e.g., the other communication apparatus 250, is called to thereby form a communication path to the destination apparatus.

Next, at step S113, processing which precedes well-known facsimile communication processing is executed to determine whether the other communication apparatus supports a private security function. If the other communication apparatus does not support a private security function, control proceeds to step S107. Here, in a manner similar to that of the usual case described above, the document image data that has been stored in the image memory 104 is sent to the destination apparatus as is and the latter executes processing similar to the usual facsimile communication processing.

If it is found at step S113 that the other apparatus does have a private security function, on the other hand, then control proceeds to step S114. Here the other communication apparatus 250 is notified of the fact that the communication to follow will be a confidential transmission and then the transmission data that has been stored in the image memory 104 is transmitted to the other communication apparatus 250 at the destination via the public-network interface 112 and public network 200. The other communication apparatus 250 performs confidential reception, such as by storing the received information in the mailbox 260, and executes reception processing in accordance with a method that enables security to be assured.

The example described above relates to a case where the apparatus of the embodiment is provided on the transmitting side. However, the apparatus can operate also as an apparatus provided on the receiving side. In such case encrypted data that has been encrypted and sent when security is required is applied to the encryption processor 113. The latter decodes the data by decryption.

Facsimile data that has been sent by confidential transmission may be stored in a designated mailbox and the designated recipient may be informed of the fact that confidential reception took place.

Thus, in accordance with the embodiment described above, there are provided means for transmitting a document by facsimile, means for transmitting a document as by electronic mail, means for designating which of these two means is to transmit a document, and means for designating whether a document is to be kept confidential. As a result, when confidentiality of a document is designated and transmission by electronic mail is designated at the time of transmission, the document can be transmitted upon being encrypted. Thus, a document can be sent and received safely by an electronic-mail function even in applications where a high level of security is required. Furthermore, facsimile communication can be carried out as well and in this case also a private security function can be used satisfactorily to maintain an equivalent level of security.

For example, if an indication for assuring security is made when document information is transmitted, image data is encrypted in a case where the document is transmitted by an electronic-mail function and the above-mentioned private security function is used in a case where the document is transmitted by facsimile. Thus there can be provided a communication apparatus that is capable of affording an equivalent level of security without the user needing to be aware of the difference between a facsimile transmission and an electronic-mail transmission.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present invention is applied to the above-mentioned storage medium, program code corresponding to the flowchart of FIG. 2 described earlier would be stored on the storage medium.

Thus, in accordance with the present invention, as described above, there can be provided a communication apparatus that is capable of affording an equivalent level of security without the user needing to be aware of the difference between a facsimile transmission and an electronic-mail transmission. Specifically, if an indication for assuring security is made when a document is transmitted, image data is encrypted in a case where the document is transmitted by an electronic-mail function, and the above-mentioned private security function is used, if possible, in a case where the document is transmitted by facsimile.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus connected to a communication network, said apparatus comprising:

destination designating means for designating a destination apparatus;

input means for inputting transmission information to be transmitted to the destination apparatus designated by said destination designating means without using the communication network;

facsimile communication means for transmitting the transmission information inputted by said input means to a destination apparatus in accordance with facsimile communication specifications;

encryption means for encrypting the transmission information inputted by said input means without using the communication network, wherein the transmission information is encrypted before being transmitted through the communication network to maintain confidentiality of the transmission information;

electronic-mail communication means for transmitting the transmission information inputted by said input means or encrypted by said encryption means to a destination apparatus in accordance with electronic-mail specifications;

communication designating means for causing transmission of the transmission information by selecting either said facsimile communication means or said electronic-mail communication means;

security designating means, comprising a confidential button, for designating whether the transmission information is confidential or not according to an operation of said confidential button, wherein said confidential button is used when confidentiality of the transmission information is to be maintained, regardless of whether the transmission information is to be sent as e-mail or as a facsimile transmission; and control means for controlling said facsimile communication means, said encryption means, and said electronic-mail communication means such that, if the transmission information has been designated as being confidential by said security designating means, said facsimile communication means transmits the inputted transmission information to the destination apparatus by facsimile transmission using a private security function which enables the inputted transmission information to be outputted by the destination apparatus when a correct secret number is entered, through the communication network without the encryption of the inputted transmission information by said encryption means, when said facsimile communication means has been designated by said communication designating means, and said electronic-mail communication means sends the encrypted transmission information to the destination apparatus by electronic mail through the communication network, when said electronic-mail communication means has been designated by said communication designating means.

2. A computer-program product embodying a computer program for implementing functions described in claim 1.

3. A computer-readable recording medium storing a computer program for implementing functions described in claim 1.

4. The apparatus according to claim 1, wherein, when the transmission information has been designated as being confidential by said security designating means, said facsimile communication means checks to determine whether the destination apparatus possesses a private security function by inquiring as to whether the destination apparatus possesses the private security function, when a communication path to the destination apparatus is formed.

5. A computer-program product embodying a computer program for implementing functions described in claim 4.

6. A computer-readable recording medium storing a computer program for implementing functions described in claim 4.

7. The apparatus according to claim 1, wherein said security designating means makes a determination that the transmission information is confidential when transmission by a confidential communication is designated.

8. The apparatus according to claim 1, wherein said input means comprises a document reader and the transmission information is inputted by reading a document using the document reader.

9. The apparatus according to claim 1, wherein the communication network includes at least one of a telephone network and a LAN.

10. A communication method in a communication apparatus connected to a communication network, said method selectively executing facsimile communication for transmitting transmission information to a destination apparatus in accordance with facsimile communication specifications and electronic-mail communication for transmitting transmission information to a destination apparatus in accordance with electronic-mail specifications, and said method comprising the following steps, in a case where the transmission information is to be transmitted to a destination apparatus as confidential information:

an apparatus designation step of designating a destination apparatus;

an input step of inputting transmission information to be transmitted to the destination apparatus designated in said designation step without using the communication network;

a security designation step of designating whether the inputted transmission information is confidential information or not according to an operation of a confidential button, wherein the confidential button is used when confidentiality of the transmission information is to be maintained, regardless of whether the transmission information is to be sent as e-mail or as a facsimile transmission;

a transmission step of transmitting the transmission information inputted in said input step to the destination apparatus as is by facsimile transmission, using a private security function which enables the inputted transmission information to be outputted by the destination apparatus when a correct secret number is entered, through the communication network without the encryption of the outputted transmission information, when communication is performed in accordance with facsimile communication and the transmission information has been designated as being confidential information; and encrypting the transmission information inputted in said input step without using the communication network, if the transmission information has been designated as being confidential information, and then sending it to the destination apparatus by electronic mail through the communication network to maintain confidentiality of the transmission information, when communication is performed in accordance with electronic-mail communication.

11. A computer-program product embodying a computer program for implementing functions described in claim 10.

12. A computer-readable recording medium storing a computer program for implementing functions described in claim 10.

13. The method according to claim 10, wherein the transmission information is document information that has been obtained by reading a document.

14. A communication apparatus connected to a communication network, said apparatus comprising:

- a destination designating unit adapted to designate a destination apparatus;
- an input unit adapted to input transmission information to be transmitted to the destination apparatus designated by said destination designating unit without using the communication network;
- a facsimile communication unit adapted to transmit the transmission information inputted by said input unit to a destination apparatus in accordance with facsimile communication specifications;
- an encryption unit adapted to encrypt the transmission information inputted by said input unit without using the communication network, wherein the transmission information is encrypted before being transmitted through the communication network to maintain confidentiality of the transmission information;
- an electronic-mail communication unit adapted to transmit the transmission information inputted by said input unit or encrypted by said encryption unit to a destination apparatus in accordance with electronic-mail specifications;
- a communication designating unit adapted to cause transmission of the transmission information by selecting either said facsimile communication unit or said electronic-mail communication unit;
- a security designating unit, comprising a confidential button, adapted to designate whether the transmission information is confidential or not according to an operation of confidential button, wherein said confidential button is used when confidentiality of the transmission information is to be maintained, regardless of whether the transmission information is to be sent as e-mail or as a facsimile transmission; and
- a control unit adapted to control said facsimile communication unit, said encryption unit, and said electronic-mail communication unit such that, if the transmission information has been designated as being confidential by said security designating unit, said facsimile communication unit transmits the inputted transmission information to the destination apparatus by facsimile transmission, using a private security function which enables the inputted transmission information to be outputted by the destination apparatus when a correct secret number is entered, through the communication network without the encryption of the inputted transmission information by said encryption means, when said facsimile communication unit has been designated by said communication designating unit, and said electronic-mail communication unit sends the encrypted transmission information to the destination apparatus by electronic mail through the communication network, when said electronic-mail communication unit has been designated by said communication designating unit.

* * * * *

UNITED STATES PATENT AND TRADEMARK OFFICE
CERTIFICATE OF CORRECTION

PATENT NO. : 6,947,968 B2
APPLICATION NO. : 09/451882
DATED : September 20, 2005
INVENTOR(S) : Shoichi Yamaguchi It is certified that error appears in the above-identified patent and that said Letters Patent is hereby corrected as shown below:

On Title Page, Col. 1 AT (*) NOTICE

Insert: --This patent issued on a continued prosecution application filed under 37 CFR1.53(d), and is subject to the twenty year patent term provisions of 35 U.S.C. § 1.54(a)(2).--.

On Title Page, Item (30) Col. 1 AT (30) FOREIGN APPLICATION PRIORITY DATA

"Sep. 12, 1998" should read --Dec. 9, 1998--.

Signed and Sealed this

Nineteenth Day of September, 2006

JON W. DUDAS
*Director of the United States Patent and Trademark Office*